Patented Apr. 10, 1928.

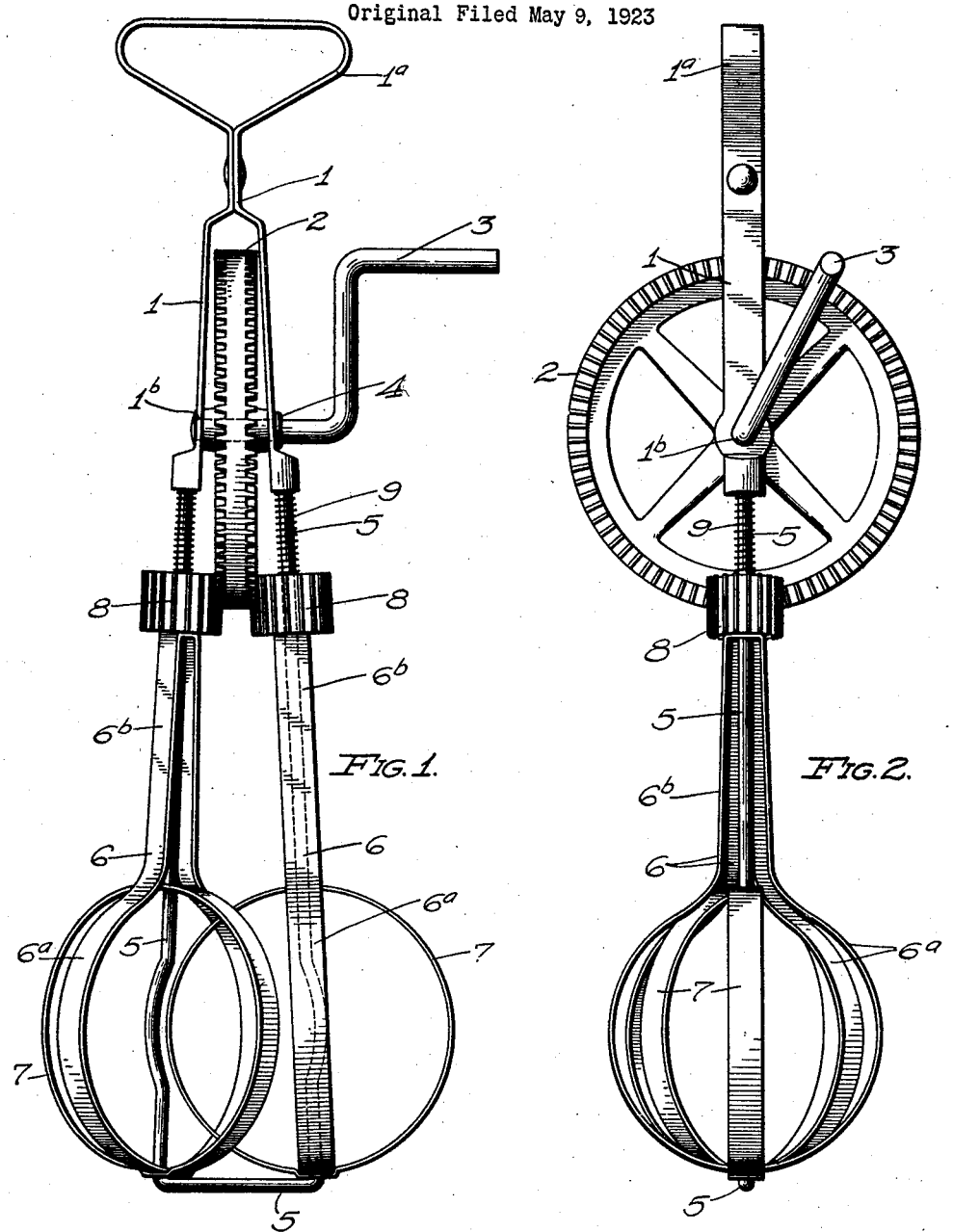

1,665,879

UNITED STATES PATENT OFFICE.

SCOTT S. GRAVES, OF SAN DIEGO, CALIFORNIA.

EGG BEATER.

Application filed May 9, 1923, Serial No. 637,646. Renewed September 16, 1926.

My invention relates to egg beaters, and the objects of my invention are: First, to provide an egg beater which is so constructed that all parts are readily accessible for cleaning and therefore may be kept clean and sanitary at all times; second, to provide an egg beater in which the engaging driving members are shiftably mounted relatively to each other so that they may be readily shifted for cleaning purposes; third, to provide a novelly constructed egg beater of this class, and fourth, to provide an egg beater which is very simple and economical of construction, durable, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my egg beater and Fig. 2 is another side elevational view thereof, taken at a right angle to that of Fig. 1.

Like characters of reference refer to similar parts and portions throughout the several views of the drawings.

The frame 1, drive gear 2, crank 3, collar 4, beater-member support 5, beater-members 6 and 7, pinions 8, and the springs 9, constitute the principal parts and portions of my egg beater.

The frame 1 is made of an integral piece bent and forming a handle or grip portion 1ᵃ at its upper end, and forming a bifurcated portion at the lower free ends thereof, which extend downwardly from the riveted portion and between which bifurcated portion is revolubly mounted the gear 2 and supported thereon by the crank 3, which extends through and is journaled in the journal portions 1ᵇ in the bifurcated portion of the frame 1, said crank being riveted over at the end extending through said frame and provided with a collar or shoulder 4, preferably an integral part thereof, at the other side of the frame, which shoulder and riveted portions position the arms of the bifurcated portion of the frame. At the ends of the bifurcated portion of the frame 1 are secured the free ends of the legs of the U-shaped beater-member support 5, which ends are spaced closer together than at their opposite connected ends. On the legs or upright portions of the beater-member support are revolubly and shiftably mounted the beater-members 6 and 7. The beater-members 6 are provided at their lower ends with loop portions 6ᵃ, the lower ends of which are revolubly mounted on the lower portions of the beater-member support and are provided with arms 6ᵇ extending upwardly from the loop portions, the upper ends of which are also revolubly mounted on the beater-member support. At the upper ends of the extended arms of said beater-members 6 are secured the pinions 8, which are adapted to engage near their upper ends the teeth on either side of the drive gear 2. Intermediate the upper portions of the pinions 8 and the frame 1, to which the U-shaped beater-member support is secured, are positioned the compression springs 9 to retain the pinion and beater-members in a downward position when in use. Within the loop portion of the beater-members 6 and at right angles thereto, and also secured thereto at their lower ends, are the beater-members 7 in hoop form, which members 7 are revolubly mounted at the upper and lower portions of the hoop on the upright portions of the beater-member support. Thus it will be seen that the inner portions of the beater-members, as well as the arms extending therefrom, are readily accessible for cleaning purposes.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

It is obvious from this construction that there is provided an egg beater which is so constructed that all parts are readily accessible for cleaning and therefore may be kept clean and sanitary at all times; that there is provided an egg beater in which the engaging driving members are shiftably mounted relatively to each other so that they may be readily shifted for cleaning purposes; that there is provided a novelly constructed egg beater of this class, and an egg beater which is very simple and economical of construction, durable, and which will not readily deteriorate or get out of order.

Having thus described my invention, what I claim as new and desire to secure by Letters Patent, is:

1. An egg beater, including a frame, a gear revolubly mounted on said frame, a crank member secured to said gear for turning the same, a beater-member support secured to said frame and extending therefrom, a beater-member provided with a loop portion at its lower end and arms extending upwardly therefrom, the lower end of said loop portion being revolubly mounted on said beater-member support, a pinion secured to the extended arms of said beater-member and revolubly mounted on said beater-member support and shiftable relatively to said gear, and a spring interposed between said pinion and said frame.

2. An egg beater, including a frame, a beater-member support secured at the lower end of said frame, a beater-member provided with a loop at its lower portion and with arms extending upwardly therefrom, revolubly mounted on said beater-member support, another wholly annular beater-member positioned within and at right angles to the loop portion of said first mentioned beater-member and revolubly mounted at its upper and lower portions on said beater-member support, said beater-members being also longitudinally shiftable on said beater-member support, and means for driving said beater-members.

3. An egg beater, including a frame, a gear revolubly mounted on said frame, and combined beater members and pinions resiliently and revolubly mounted on said frame meshing with and operated by said gear whereby said combined beater members and pinions are readily shiftable relatively to said gear.

4. In an egg beater, a frame, a gear revolubly mounted on said frame, combined beater members and pinions revolubly and shiftably mounted relatively to the gear teeth, and another wholly annular beater member secured to the lower side of each of said beater members and positioned at right angles thereto.

5. In an egg beater, a beater member support, a beater member provided with a loop at its lower portion and with arms extending upwardly therefrom, revolubly mounted on said beater member support, and another wholly annular beater member extending within and at right angles to the loop of said first mentioned beater member and secured at its lower portion to said first mentioned beater member and revolubly mounted at its upper portion on said support.

6. In an egg beater, a frame, a gear revolubly mounted thereon, a beater member revolubly mounted and longitudinally shiftable on said frame, a pinion connected with said beater member and meshing with said gear, and means tending to hold said beater member downwardly.

7. In an egg beater, a frame, a gear revolubly mounted thereon, a beater member revolubly mounted and longitudinally shiftable on said frame, a pinion secured to said beater member, revolubly and shiftably mounted on said frame and meshing with said gear, and means tending to hold said beater member downwardly.

In testimony whereof, I have hereunto set my hand at San Diego, California, this 2nd day of May, 1923.

SCOTT S. GRAVES.